Sept. 12, 1944.   B. E. LUBOSHEZ   2,358,092
OBJECTIVE CAMERA
Filed Dec. 17, 1942
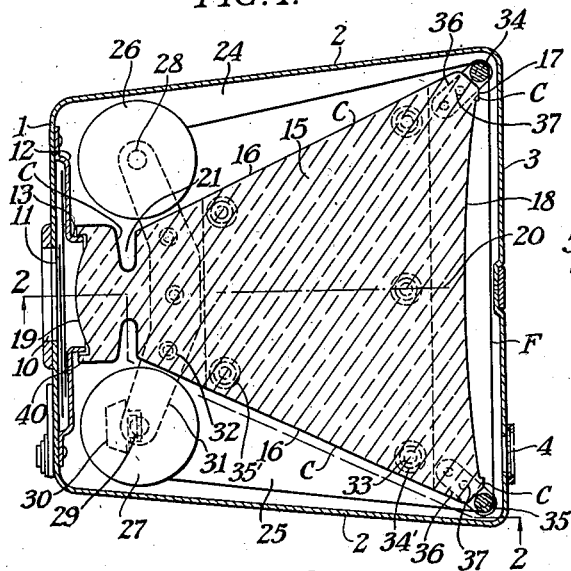
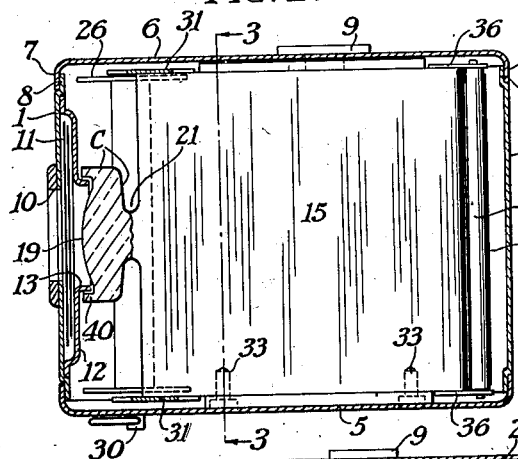
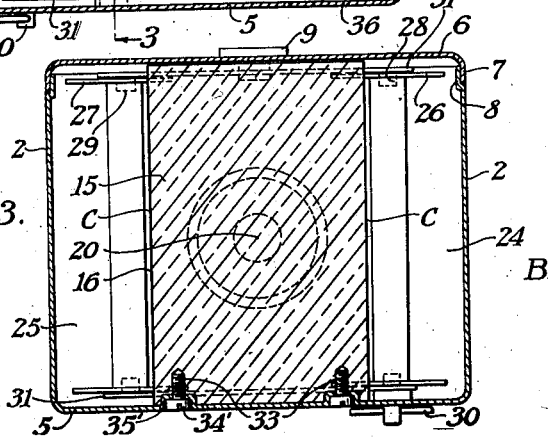
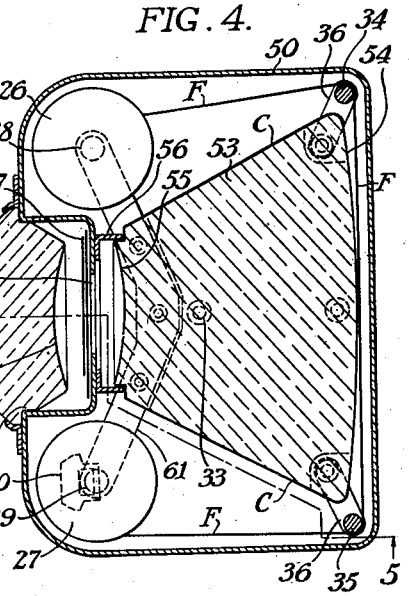
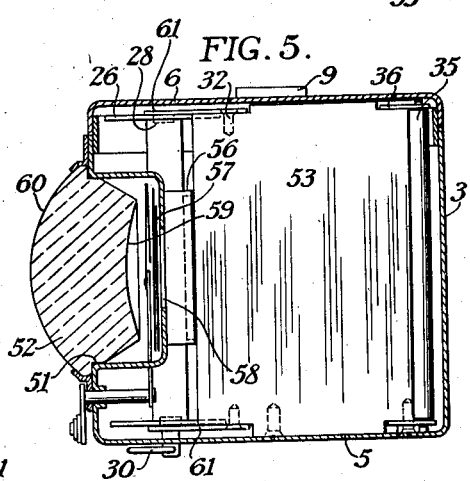
BENJAMIN E. LUBOSHEZ
INVENTOR
BY
ATTORNEYS Patented Sept. 12, 1944

2,358,092

UNITED STATES PATENT OFFICE 2,358,092

OBJECTIVE CAMERA

Benjamin E. Luboshez, Rochester, N. Y., assignor to Eastman Kodak Company, Rochester, N. Y., a corporation of New Jersey Application December 17, 1942, Serial No. 469,336

16 Claims. (Cl. 95—31)

This invention relates to photography and more particularly to photographic cameras. One object of my invention is to provide an integral lens camera of the utmost simplicity and one which is easy to manufactture and which consists of very few parts. Another object of my invention is to provide an integral lens camera in which parts of the objective, which may be made in one or more pieces, can be used for additional structural features of the camera. Another object of my invention is to provide a camera having the minimum number of parts which include an objective which forms a part of the roll holding mechanism and other objects will appear from the following specification, the novel features being particularly pointed out in the claims at the end thereof.

In the past, it has always been comparatively difficult to make exceedingly small, short focal length objectives because the lenses entering into such a combination are frequently of very small size and are consequently difficult to handle and to mount. One of the objects of my present invention is to provide a camera structure including a relatively short focal length objective which is, however, made of a quite large individual piece, or, where more than one lens is used, which may be made of relatively large pieces of light refracting material.

Most known types of cameras employ several sets of camera walls to provide spool chambers, an exposure frame, and exterior camera walls, and considerable expense results from the interfitting of these various walls to make light-tight connections between the several parts. One of the objects of my present invention is to eliminate a number of the usual camera walls while maintaining the same general type of camera—that is a camera in which roll film may be used—each film spool being mounted in a separate and light-tight film spool chamber, the film being lead across an exposure frame. A further object of my present invention is to eliminate quite a number of parts that go into the usual types of cameras.

It has always been the practice in providing simple types of cameras to provide one or more fixed diaphragm or stop members through which light passes to make an exposure and these stop members have almost invariably consisted of a perforated plate of metal which had to be mounted in the right position relative to the camera objective. Another objective of my invention is to provide integrally with an element of a camera lens, a fixed diaphragm which will always remain in place, and which does not require the addition of extra parts.

Coming now to the drawing wherein like reference characters denote like parts throughout:

Fig. 1 is a transverse section through a camera constructed in accordance and embodying a preferred form of my invention;

Fig. 2 is a section taken on line 2—2 of Fig. 1;

Fig. 3 is a section taken on line 3—3 of Fig. 2;

Fig. 4 is a transverse section of a camera constructed in accordance with a second embodiment of my invention;

Fig. 5 is a section taken on line 5—5 of Fig. 4; and

Fig. 6 is a fragmentary sectional detail showing a camera objective which is a modification of the camera objective shown in Fig. 4.

In its broadest aspects my invention relates to a camera in which the total thickness of the transparent light refracting material of the objective shall be greater than three-quarters of the focal length of the lens formed from the light refracting material and that at least one of the surfaces of the lens shall be in close proximity to the focal plane and not farther than a quarter of the focal length away from the focal plane. By means of this type of objective construction, portions of the light refracting material of which the objective is made can be used for portions of the camera and, in addition, the parts may be made of a relatively large size. This is particularly desirable in the case of extreme miniature cameras such as those using film of a width from 16 to 20 mm. because in such cameras it is customary to employ extremely small lenses which because of their size are quite difficult to handle.

Such lens construction is particularly useful at the present time because there are a number of new transparent plastic materials having desirable refractive indices which are suitable for use with such lens construction. In fact, recent developments have indicated that surfaces can be molded or cast with sufficient accuracy for use as camera lenses and particularly for use with inexpensive type cameras where the degree of precision is not held to the close accuracy which is required for the higher grade types of astigmatic lenses.

A typical example of a camera constructed in accordance with a preferred embodiment of my invention is shown in Fig. 1 wherein there is a camera having a front wall 1, side walls 2, and a rear wall 3, the latter having the usual red or green window 4 through which numerals on film backing paper may be observed in the usual way.

This camera is preferably provided with a bottom wall 5 and a top wall 6 which includes a downwardly extending flange 7 to engage the offset 8 in the camera body so as to form a cap which may be opened by releasing a suitable latch 9 for loading film into the camera or for removing exposed film therefrom.

The front wall 1 includes an opening 10 through which an exposure may be made when a shutter diagrammatically illustrated at 11 is operated to permit light rays to pass therethrough. This shutter may be mounted in a casing 12 having a rearwardly formed annular flange 13.

The objective designated broadly as 15 is preferably composed of a block of a clear plastic material having a suitable index of refraction, or of glass. In the present instance the block of light refracting material 15 is roughly in the form of a truncated pyramid having tapering walls 16 on the sides which lead rearwardly to the rear wall 17, the greater portion of which is formed with a curved lens surface 18. This wall in the form shown in Fig. 1 is located near the rear of the camera and close to the film F which at this point is stretched across a focal plane.

The front wall 19 of the block of light refractive material is curved to form a front lens surface, this surface and the rear lens surface 18 being positioned on a common axis 20.

Also coaxially arranged on the axis 20 is an annular groove 21, this groove constituting a diaphragm for the lens, since it limits the bundle of light rays passing through the lens when the shutter is actuated.

I prefer to coat all of the lens block not being used optically with a light absorbing medium, such as a dull black paint or lacquer, to prevent film fogging internal reflections and to form light-tight walls. The surfaces so coated are indicated by the reference characters C which are applied to the various coated walls.

In the camera shown in Fig. 1 the lens block 15 forms, between the walls 16 and camera side walls 2, film chambers 24 and 25 in which a supply spool 26 and a takeup spool 27 may be mounted on suitable spool centering means 28 and 29. A film winding key 30 is provided for turning the takeup spool in the usual manner and the brackets 31 carrying the spool centering mechanisms are carried by a portion of the lens block 15. Thus they may be attached by suitable rivets or screws 32 directly to the lens block.

The lens block 15 may be attached directly to the bottom wall 5 of the camera as by screws 33, the heads of which 34 lie in suitable recess 35 as indicated in Fig. 3. I also provide a pair of film guide rollers 34 and 35, each of which may be supported by a pair of brackets 36 and these brackets also may be attached as by rivets or screws 37 to the lens block 15.

This construction greatly simplifies the parts normally used in such a camera because the camera consists merely in an outer shell in which the lens block 15 forms a portion of an inner shell and in which this member also constitutes a lens and a means for supporting and guiding a film through the focal plane.

I prefer to surround the front lens surface 19 with an outwardly extending flange 40 to telescope the rearwardly extending flange 13 of the shutter casing so as to form a light-tight joint thereabout.

A second embodiment of my invention is much like the first except that a somewhat higher grade type of objective may be made in two or more pieces. In this embodiment the general arrangement of the camera body is quite similar to the first embodiment in that the camera body 50 consists of a shell having a front opening 51 through which light may pass to a film F lying in the focal plane of an objective formed by the lenses 52 and 53. In this instance the lens 52 may be fixedly mounted and is preferably made of relatively large size and the rear lens element 53 has a surface 54 lying close to the film and an opposite surface 55 lying close to and telescoping the rearwardly extending flange 56 of a shutter 57 which is only diagrammatically illustrated. In this embodiment the shutter is provided with a diaphragm 58 and the curvature of the lens 52 over the surfaces 59 and 60 is designed to produce an image with the lens element 53 on a film F stretched across the focal plane.

As before, I prefer to coat the areas indicated at C with a light absorbing material which will make an interior light-tight camera wall and I prefer to provide film spool mounts 61 similar to the mounts 31 fully described with regard to the first embodiment of my invention. Here, again, even though the camera construction is extremely simple, it is inexpensive, easy to assemble and quite compact for a camera taking the size of picture indicated in the drawing.

If it is desired to make the camera of Fig. 4 a focusing camera, the front lens element 72 may be carried in a movable mount 73 which may be moved on the axis 70 of the objective through a threaded connection at 74 with the camera front 75. The rear lens element 76 may be the same as that shown in Fig. 4. Thus, by turning the lens cell 73, an element 72 may be moved to or from the lens element 76 for focusing.

In all of the illustrated forms of my invention it will be noticed that one or more elements of the lens are made of a thick lens block which has a thickness greater than three-quarters of the overall length of the camera and of the focal length of the lens and that in each case at least one surface of the objective lies close to both the film and to the rear wall of the camera. Such a construction makes it possible to provide a relatively wide angle lens for such a camera and one which is constructed of relatively large parts. While I prefer to utilize a suitable transparent material, such as suitable plastics, for my preferred type of objective, it is nevertheless entirely possible to make such an objective of glass, molded for the most part, and given a grinding or polishing operation where the more accurate lens surfaces are required. In fact, it may be possible to mold some of the lens surfaces with sufficient accuracy to produce a reasonably good image, although it would probably be desirable to grind and polish the lens surfaces for best results.

I claim:

1. A photographic camera comprising a camera body, an objective carried thereby comprising a light refracting block having axially positioned lens surfaces and at least two flat sides, and means, carried by the flat sides for positioning a film in a focal position with respect to said lens.

2. A photographic camera comprising a camera body, an objective carried thereby comprising a light refracting block having axially positioned lens surfaces and at least two flat sides, and means, carried by the flat sides for positioning a film in a focal position with respect to said lens said means including film guides fastened to the flat sides of the lens walls.

3. A camera including as a part thereof an objective formed from material having lens surfaces axially positioned thereon, said objective having a plurality of non-image forming walls, at least one wall lying in a plane, means for attaching said objective to said camera through the wall lying in a plane, and a light absorbing coating on the non-image forming walls.

4. A camera including as a part thereof an objective formed from material having lens surfaces axially positioned thereon, said objective having a plurality of non-image forming walls, and a light absorbing coating on the non-image forming walls, a restriction coaxially of the lens surfaces and forming a diaphragm for said lens formed in the material of the objective.

5. A camera including as a part thereof an objective formed from material having lens surfaces axially positioned thereon, said objective having a plurality of non-image forming walls, and a light absorbing coating on the non-image forming walls, restricted ring-like walls integral with the objective and positioned coaxially of the lens surfaces, and a light obstructing coating carried by the ring-like formings constituting a diaphragm therefore.

6. In a camera, the combination with a camera body, of a film support near the rear wall of the camera body, and a light admitting aperture in the front wall of the camera body, and a lens element through which light rays pass through the aperture to the film and consisting of a single block of light refracting material extending from an area near the rear wall of the camera to a position near the light admitting aperture in the front wall whereby the single block of refracting material substantially fills the inside of the camera body.

7. In a camera, the combination with a camera body, of a film support near the rear wall of the camera body, and a light admitting aperture in the front wall of the camera body, and a lens element through which light rays pass through the aperture to the film and consisting of a one piece block of light refracting material extending from an area near the rear wall of the camera to a position near the light admitting aperture in the front wall, a camera shutter mounted in front of the refracting material and adjacent the front wall of the camera for operation to make an exposure.

8. In a camera, the combination with a camera body, of a film support near the rear wall of the camera body, and a light admitting aperture in the front wall of the camera body, and a lens element through which light rays pass through the aperture to the film and consisting of a block of light refracting material of roughly the form of a truncated pyramid extending the major part of the distance between the front and rear walls of the camera, and a camera shutter positioned for actuation to make an exposure in axial alignment with said lens element and controlling light rays passing therethrough.

9. In a camera, the combination with a camera body, of a film support near the rear wall of the camera body, and a light admitting aperture in the front wall of the camera body, and a lens element through which light rays pass through the aperture to the film and consisting of a block of light refracting material of roughly the form of a truncated pyramid extending the major part of the distance between the front and rear walls of the camera, and a camera shutter positioned for actuation to make an exposure in axial alignment with said lens element and controlling light rays passing therethrough, and supports carried by said block of light refracting material for rollably carrying film spools, one on each side of said block of material.

10. In a camera, the combination with a camera body, of a film support near the rear wall of the camera body, and a light admitting aperture in the front wall of the camera body, and a lens element through which light rays pass through the aperture to the film and consisting of a block of light refracting material roughly the form of a truncated pyramid extending the major part of the distance between the front and rear walls of the camera, and a camera shutter positioned for actuation to make an exposure in axial alignment with said lens element and controlling light rays passing therethrough, spool centering supports carried at least partially by said block of light refracting material, one on each side thereof, and film guides, also carried by said material near the end adjacent the rear wall of the camera about which film may pass from a film spool held by a support on one side of the refractive material to a film spool on the opposite side thereof.

11. A camera including a one-piece objective comprising a block of light refractive material extending substantially the full length of the camera, lens surfaces on the front and rear ends of said light refractive material, and a light absorbing coating on all the walls of said material except said lens surfaces.

12. A camera including a one-piece objective comprising a block of light refractive material extending substantially the full length of the camera, lens surfaces on the front and rear ends of said light refractive material, a groove formed in said block of light refracting material in axial alignment with the axes of the lens surfaces for restricting light rays passing through said objective, at least one wall of said groove including a light obstructing material.

13. A camera having front, back and side walls and including an objective including a block of light refracting material mounted therein and extending through the major portion of the length of the camera, said block of refracting material having formed therein axially disposed lens surfaces near the camera front and camera back, oppositely disposed walls on the block of refractive material spaced from the side walls of the camera to form film chambers, and means carried by the said walls of the block of refractive material for making said spool chambers light tight.

14. A camera including an outer casing including front, back, side, top and bottom walls, a light opening in the front wall, an objective including a thick block of light refracting material extending substantially the length of the camera casing, and an inner light-tight casing providing film spool chambers, the side walls of which also constitute side walls of the block of light refractive material.

15. A camera including an outer casing including front, back, side, top and bottom walls, a light opening in the front wall, an objective including a thick block of light refracting material extending substantially the length of the camera casing, and an inner light-tight casing providing film spool chambers the side walls of which also constitute side walls of the block of light refractive material, and means including an opaque coating thereon for making said walls light tight.

16. A camera including an outer casing including front, back, side, top and bottom walls, a light opening in the front wall, an objective including a thick block of light refracting material extending substantially the length of the camera casing, and an inner light-tight casing providing film spool chambers, the side walls of which also constitute side walls of the block of light refractive material, a shutter casing mounted in the casing, and means carried by the block of refractive material for forming a light-tight joint with the shutter casing.

BENJAMIN E. LUBOSHEZ.